(12) United States Patent
Chen (10) Patent No.: US 9,980,349 B2
(45) Date of Patent: May 22, 2018

(54) SPATIALLY AND TEMPORALLY SMOOTH OCCUPANCY LIGHTING

(71) Applicant: Nancy H. Chen, North Andover, MA (US)

(72) Inventor: Nancy H. Chen, North Andover, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days. days.

(21) Appl. No.: 15/260,317

(22) Filed: Sep. 8, 2016

(65) Prior Publication Data

US 2018/0070426 A1    Mar. 8, 2018

(51) Int. Cl.
   *H05B 37/02* (2006.01)
(52) U.S. Cl.
   CPC ..... *H05B 37/0245* (2013.01); *H05B 37/0227* (2013.01); *H05B 37/0272* (2013.01)
(58) Field of Classification Search
   CPC  H05B 37/02; H05B 37/0227; H05B 37/0272; H05B 37/0245; F21V 23/0471; F21V 23/0435; F21S 48/115; F21S 48/1747; F21W 2131/40; G06K 9/00771; H04N 7/183
   See application file for complete search history.

(56) References Cited

U.S. PATENT DOCUMENTS

| 8,100,552 B2 * | 1/2012 | Spero | B60Q 1/04 362/227 |
| 9,220,156 B2 * | 12/2015 | Bishop | G08C 17/02 |
| 9,338,409 B2 * | 5/2016 | Zhang | H04N 7/18 |
| 9,711,036 B2 * | 7/2017 | Fadell | G08B 25/008 |
| 2010/0201267 A1 | 8/2010 | Bourquin et al. | |
| 2011/0115910 A1 | 5/2011 | Brackney | |

(Continued)

FOREIGN PATENT DOCUMENTS

EP   1408276 A2   4/2004

OTHER PUBLICATIONS

Alone at Work by Regent Lighting, obtained from http://www.lighting-malta.com/pdf/ALONE_WORK.pdf (last accessed Dec. 9, 2016). Additional information at http://www.regent.ch/en/products/technologies/alone-at-workr.html.

(Continued)

*Primary Examiner* — Haissa Philogene
(74) *Attorney, Agent, or Firm* — Yutian Ling (57) ABSTRACT

A system for providing spatially and temporally smooth occupancy lighting includes a sensor and a controller. The sensor is configured to determine a precise location of the occupant. The controller determines a number of lighting fixtures that are relevant to the location of the occupant. The light output of the lighting fixtures is controlled by the controller using a function that varies the light output depending on the location of the occupant. The function can change the light output based upon a distance between the occupant and the one or more lighting fixtures. For example, the function can increase the light output as the occupant moves closer to a fixture, and likewise decrease the light output as the occupant moves away from a fixture. In another example, the function can maintain a target illuminance at a particular spot within the space or an overall illuminance for all lighting fixtures.

20 Claims, 6 Drawing Sheets

(56) References Cited

U.S. PATENT DOCUMENTS

2014/0042915 A1    2/2014   Ono et al.
2014/0103814 A1    4/2014   Both
2017/0135179 A1    5/2017   Balazs et al.

OTHER PUBLICATIONS

Plamann, Tobias, International Search Report and Written Opinion of the International Searching Authority, for counterpart application PCT/US2017/045284, dated Oct. 17, 2017, European Patent Office, Rijswijk, The Netherlands, 13 pages.

* cited by examiner

SPATIALLY AND TEMPORALLY SMOOTH OCCUPANCY LIGHTING

TECHNICAL FIELD

The present invention relates to lighting, and more specifically, to lighting systems that provide lighting to occupants within a space.

BACKGROUND

In an effort to save energy, many modern spaces utilize occupancy sensors to detect occupants in a room. During occupancy (i.e. when an occupant is detected in the room), the lights are turned on and during vacancy (i.e. when there is no occupant detected in the room), the lights are turned off or put into an energy savings mode. Typically each room has a respective sensor and the lighting in the entire room is operated in unison based on the sensor output. In some instances, for a larger space, the space may be divided into zones, with an occupancy sensor in each zone controlling the lighting for that zone.

SUMMARY

Implementing a temporally and spatially smooth occupancy lighting system involves a number of non-trivial issues, particularly in a space having multiple lighting fixtures. For example, typical occupancy lighting systems are arranged such that as a person enters the range of a sensor, occupancy is detected and the light suddenly turns on, which can be distracting or disconcerting. Additionally, particularly annoying lighting behavior may result as an occupant moves just-in or just-out of range of a sensor. This can cause, for example, the lighting to toggle between an on state and an off state unnecessarily. The on state refers to a high output setting, and the off state refers to a low or no (zero) output setting (i.e. dimmest). Such discontinuous behavior of the lighting that immediately changes upon occupancy detection would be undesirable, because the lighting condition changes so drastically. There is a need for a lighting system that provides a gradual and smooth transition to different output levels, without requiring position thresholds at which a lighting fixture suddenly turns on. It is therefore desirable to provide occupancy lighting that is temporally and spatially smooth or otherwise gradually transition for an occupant as they are located in, and move throughout, a space.

Thus, in accordance with embodiments, a system for providing spatially and temporally smooth occupancy lighting is provided. The spatially and temporally smooth occupancy lighting system includes one or more sensors operatively connected to a controller. In an embodiment, the sensor(s) is configured to determine a precise location of the occupant. Location information is then sent to the controller of the system. The controller determines one or more lighting fixtures that are relevant to the location of the occupant. In an embodiment, the output of the one or more lighting fixtures in the area relevant to the location of the occupant is controlled by the controller such that the output of the one or more lighting fixtures is determined using a control function that varies the light output of the one or more lighting fixtures relevant to the location of the occupant (or other feature of interest), as determined by the sensor. In some embodiments, the controller controls all lighting fixtures within an area, regardless of whether they are relevant to the location of the occupant or not, and the light output of each lighting fixture is controlled based on a control function that provides a pattern of illumination surrounding the location of the occupant. The control function can be, for example, a programmable software routine or module executable by the controller, or a hardware logic circuit or module that is controllable by or otherwise informs the controller so as to provide a gradual correlation between the illumination and the location of the occupant, rather than a mere on/off situation disclosed in conventional detection systems. For example, each light source in a space could gradually become brighter or dimmer as the occupant moves toward or away from the light source. A lighting fixture can be the brightest when the occupant is near the lighting fixture, and gradually can fade to an off or low energy state as the occupant moves away. The result is a spatially smooth distribution of light in an area surrounding the occupant. Once the illumination pattern is established, the light output of each of the light sources can be scaled up or down by the system to achieve a target illuminance.

One example control function can change the output light level of a particular fixture based upon a distance between the occupant and the particular lighting fixture. For example, the function can increase the light output (i.e. the lighting fixture becomes brighter) as the occupant moves closer to the fixture (and, thus, as the distance decreases), and decrease the light output (i.e. the lighting fixture becomes dimmer) as the occupant moves away from the fixture (and, thus, as the distance increases). In another example, a target illuminance can be maintained at a particular spot or feature within the space, which can be the same spot as the occupant location or another feature within the space. For example, in a reception area or other area desired to consistently have a particular illuminance, the illuminance in that area can be maintained at a particular level. A control function can be used in accordance with the techniques herein, for example, to determine an illumination pattern delivered by a predetermined number of lighting fixtures, in some embodiments. The illumination pattern can produce an absolute illuminance that can be scaled to maintain a target illuminance.

The location of the occupant can be determined using a number of techniques that provide for a sufficiently precise occupant location, as will be appreciated in light of the present disclosure. For example, in some embodiments, the sensors can be used to determine the precise location of the occupant to within 1-2 feet of accuracy. One technique for determining the location of the occupant is to provide a plurality of densely spaced standard occupancy sensors, such as passive infrared (PIR) sensors, that could be used together to determine the location of the occupant, rather than just whether an occupant is present or not. By providing occupancy lighting having output that is controlled by a control function or module that varies the light output for a lighting fixture depending upon the location of the occupant, a smooth lighting scheme is implemented that alleviates the problems associated with abrupt changes in light output associated with typical lighting systems that are merely on or off depending upon the respective presence or absence of an occupant.

In an embodiment, there is provided a system. The system includes: a sensor configured to sense a location of an occupant within a space; a controller configured to receive data from the sensor and control illumination provided by a number of lighting fixtures; and a control module at least one of executable on and controllable by the controller and configured to identify a number of lighting fixtures relevant to the location of the occupant based on data from the sensor, and further configured to provide a region of illumination surrounding the occupant that is based on the location of the occupant, wherein the illumination is spatially and temporally smooth lighting.

In a related embodiment, the controller may be configured to change the light output of the one or more lighting fixtures based upon a distance between the occupant and the one or more lighting fixtures. In a further related embodiment, the function provides that the one or more lighting fixtures may become brighter by the controller as the distance decreases, and the one or more lighting fixtures may become dimmer by the controller as the distance increases.

In another related embodiment, the light output of the one or more lighting fixtures may be scalable by the controller to maintain a target illuminance at a particular feature within the space. In a further related embodiment, the particular spot may be the location of the occupant.

In yet another related embodiment, the system may have a maximum allowed predetermined rate of change in the light output. In still another related embodiment, a target illuminance at the location of the occupant may be specified, and the controller may be configured to scale the light output of the one or more lighting fixtures to collectively maintain the target illuminance.

In yet still another related embodiment, the sensor may include a plurality of passive infrared (PIR) occupancy sensors that are used to determine the location of the occupant. In still yet another related embodiment, the sensor may include a camera, and the location of the occupant may be determined by analyzing two-dimensional (2D) or three-dimensional (3D) imaging data acquired by the camera.

In yet another related embodiment, the one or more lighting fixtures may be networked and the controller may be configured to maintain a target illuminance at the location of the occupant at a desired predetermined value as the occupant moves around by communicating with the one or more lighting fixtures over a wireless network.

In another embodiment, there is provided a method. The method includes: determining, using a sensor, a location of the occupant within a space; determining a predetermined number of lighting fixtures pertinent to the location of the occupant; and controlling the light output of one or more lighting fixtures of the predetermined number of lighting fixtures, using a controller operatively connected to the sensor, wherein a light output of the one or more lighting fixtures is controlled using a function, wherein the function provides a region of illumination surrounding the occupant, wherein the illumination is spatially and temporally smooth lighting.

In a related embodiment, the method may further include controlling, by the controller, the one or more lighting fixtures in the space using the function, wherein the function changes the light output of the one or more lighting fixtures depending upon the distance the occupant is separated from the one or more lighting fixtures. In a further related embodiment, the method may further include controlling the one or more lighting fixtures to become brighter as the distance decreases, and to become dimmer as the distance increases.

In another related embodiment, the method may further include controlling, by the controller, the one or more lighting fixtures to maintain a target illuminance at the location of the occupant. In still another related embodiment, the sensor may be a camera, and the method may further include analyzing two-dimensional (2D) or three-dimensional (3D) imaging data to determine the location of the occupant.

In another embodiment, there is provided a computer program product comprising one or more non-transitory processor-readable mediums encoded with instructions that, when executed by one or more processors cause a process to be carried out to provide spatially and temporally smooth lighting to an occupant, the process including: determining, using a sensor, a location of the occupant; determining a predetermined number of lighting fixtures pertinent to the location of the occupant; and controlling a light output of one or more lighting fixtures of the predetermined number of lighting fixtures, using a controller operatively connected to the sensor, wherein the light output is controlled using a function, wherein the function provides a region of illumination surrounding the occupant.

In a related embodiment, the process may further include controlling, by the controller, the one or more lighting fixtures in the space as a function of a distance the occupant is separated from the lighting fixture. In a further related embodiment, the process may further include controlling the one or more lighting fixtures to become brighter as the distance decreases, and to become dimmer as the distance increases.

In another related embodiment, the process may further include controlling, by the controller, the one or more lighting fixtures to maintain a target illuminance at the location of the occupant. In yet another related embodiment, the sensor may be a camera, and the process may further include analyzing two-dimensional (2D) or three-dimensional (3D) image data to determine the location of the occupant.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

A system for providing temporally and spatially smooth lighting to an occupant within a space is disclosed. Reference to smooth throughout refers to lighting that gradually adapts as the occupant(s) moves around the space being illuminated. Adapting may include, for instance, the gradual dimming of light in a first area and the corresponding gradual brightening of light in a second area, as a user walks from the first area to the second area within the space. In a more general sense, any lighting parameter can be gradually adjusted based on movement of occupant. The system includes one or more lighting fixtures under control of a controller. In an embodiment, the controller determines a location of the occupant using one or more sensors in the space and then determines a number of lighting fixtures pertinent to the location of the occupant. In this way, the controller predetermines a number of the lighting fixtures to be controlled. The light output of that predetermined number of the lighting fixtures is controlled by the controller. The light output set by the controller can be controlled based on an executable control module or control function that effectively results in a pattern (or region) of illumination surrounding the location of the occupant with respect to the lighting fixtures in accordance with an embodiment. The function is such that the light output of each lighting fixture varies depending upon the location of the occupant with respect to the lighting fixture, so that the light output is greatest at the occupant location, and gradually fades as distance of the relevant lighting fixtures from the occupant location increases. The light output can change as the position of the occupant changes, so that as the occupant becomes closer to a particular lighting fixture, the output increases, and likewise as the occupant moves away, the output decreases. This provides occupancy lighting that is both smooth over time (temporally) and over space (spatially) for a particular occupant. In another example, a target illuminance can be set for a particular feature in the area, which can be the same point or different point from the location of the occupant, such that the illuminance at the particular feature is maintained at a predetermined value. The control function is programmed or otherwise configured to provide an illumination pattern delivered by a predetermined number of lighting fixtures. The output of these fixtures can then be scaled proportionally to match a desired illuminance at a particular location, or feature of interest, within the space. The output can also, or alternatively, be proportionally scaled to provide a best match to an overall target illuminance for the space. Thus, according to some embodiments, the control function controls a lighting parameter of the lighting fixture so as to provide a spatially and temporally smooth occupancy lighting system that can be scaled as needed to achieve a target illuminance at a feature within a space or the overall illuminance within a space. Note that lighting parameters other than brightness can be controlled in response to movement of the occupant(s). For instance, another lighting parameter that can be adapted is color. In accordance with an embodiment of the present disclosure, the term "light output" generally refers to the light coming out of a lighting fixture or light source, the term "luminous flux" refers to the amount of light coming out of a source (when taking into account the human eye perception) and "illuminance" refers to the resulting illumination level as measured at a specific location.

Figure 1:
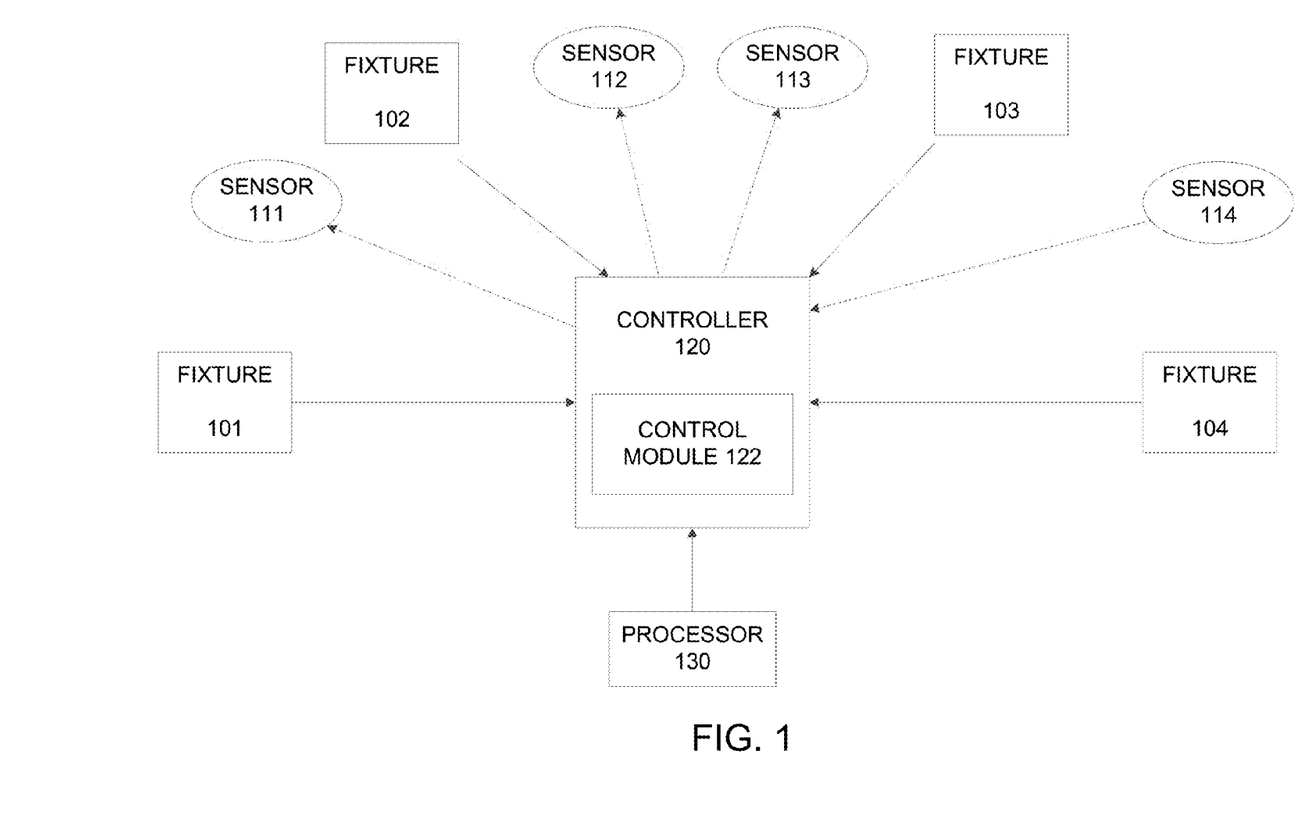
FIG. 1 illustrates a block diagram of a system for providing spatially and temporally smooth occupancy lighting, configured according to embodiments disclosed herein.

Reference is now made to FIG. 1 illustrating a block diagram of a system for providing spatially and temporally smooth occupancy lighting, configured in accordance with an embodiment of the present disclosure. A space includes an occupancy lighting system that includes lighting fixtures (101, 102, 103, 104), sensors (111, 112, 113, 114), a controller 120 and a processor 130. Although only four lighting fixtures and four respective sensors are shown, any number of lighting fixtures and any number of sensors can be implemented in a space. Additionally, although the lighting fixtures 101, 102, 103 and 104 are shown as each having a respective sensor 111, 112, 113 and 114, in some embodiments there may be one or more sensors for each of the lighting fixtures, for example two (or more) sensors for each lighting fixture to further improve accuracy of the location of the occupant. In some embodiments, there may be more than one lighting fixture associated with each sensor, for example two lighting fixtures can share a common sensor, while still providing occupant location determination. In some embodiments, the number of sensors may be dependent upon the size and arrangement of the space, irrespective of the location of the lighting fixtures, and may be completely independent of the lighting fixtures themselves, and purely used to determine location of occupant.

The lighting fixtures (101, 102, 103, 104) and sensors (111, 112, 113, 114) are each operatively connected, via wired or wireless communication, to the controller 120. The controller 120 is in communication with a processor 130 that processes the data received by the controller 120 and instructs the controller to control the light output of the connected fixtures (101, 102, 103, 104) according to the data received by the sensors (111, 112, 113, 114). In some embodiments, the controller 120 and processor 130 can be replaced with a single microcontroller, application-specific integrated circuit (ASIC), or other controller-processor arrangement capable of processing data as well as communicating with the fixtures (101, 102, 103, 104) and the sensors (111, 112, 113, 114). The control module 122 is executable on, or controllable by, the controller 110, in accordance with an embodiment. The control module 122 is configured to identify a number of lighting fixtures 101, 102, 103, 104 relevant to the location of the occupant based on data from the sensors 111, 112, 113, 114. The control module provides a region of illumination surrounding the occupant that is based on the location of the occupant.

As an occupant enters and moves through a space, the light output of the lighting fixtures is controlled by the controller so that a predetermined number of fixtures within proximity to the occupant are within a region of illumination, and once an absolute illuminance delivered by the predetermined number of fixtures is determined, the light output of the predetermined number of fixtures can be proportionally scaled to achieve a target illuminance level. A light output level of one or more of the fixtures (101, 102, 103, 104) may be changed, depending upon the information data received from one or more sensors (111, 112, 113, 114). In an embodiment, the number of fixtures is predetermined (i.e. determined before runtime operations) to be within a predetermined distance from the occupant. The shape and structure of the region of illumination is variable, as well as the number of lighting fixtures included in the predetermined number of lighting fixtures. In an embodiment, the number of fixtures can include all fixtures within an area, or a specified group of fixtures, such as those located within a single room or other specified area.

Figure 2:
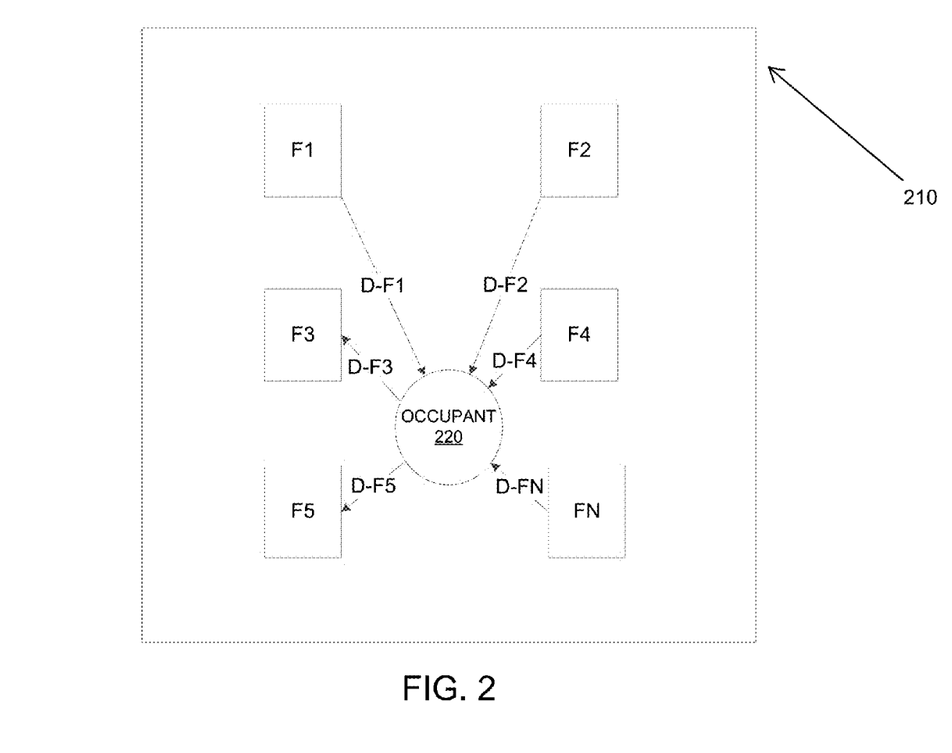
FIG. 2 illustrates a block diagram of a system including multiple lighting fixtures and an occupant, showing the relative distance between the occupant and each fixture, according to embodiments disclosed herein.

FIG. 2 illustrates a block diagram of a system including multiple lighting fixtures and an occupant within a room, showing the relative distance between the occupant and each fixture, in accordance with an embodiment of the present disclosure. The system includes a plurality of fixtures (F1, F2, F3, F4, F5 . . . FN) within a room 210 configured in accordance with an embodiment of the present disclosure. The number of fixtures is variable depending upon the particular room 210 within which the fixtures are located. Any number of fixtures can be implemented, up to FN where N is the total number of fixtures, for example if there are 60 fixtures, FN would be F60.

The output of each lighting fixture F1, F2, F3, F4, F5, . . . FN can be expressed as a function that varies the light output of a lighting fixture depending upon the distance (D) between the occupant 220 and the lighting fixture (F1, F2, F3, F4, F5, . . . FN) in the room 210, in accordance with an embodiment of the present disclosure. The control function is used by the controller to create a region of illumination and adjust the light output of the fixture depending upon the distance D between the occupant and the particular lighting fixture, according to an embodiment of the present disclosure. In one example embodiment, according to a distance-based function, the light output of fixture F1 depends upon the distance D-F1 between the fixture F1 and the occupant 220; the light output of fixture F2 depends upon the distance D-F2 between the fixture F2 and the occupant 220; the light output of fixture F3 depends upon the distance D-F3 between the fixture F3 and the occupant 220; the light output of the fixture F4 depends upon the distance D-F4 between the fixture F4 and the occupant 220; the light output of the fixture F5 depends upon the distance D-F5 between the fixture F5 and the occupant 220; and the light output of the final fixture FN depends upon the distance D-FN between the fixture FN and the occupant 220. For example, the controller can control the light output of the fixtures so that they can be scaled upward or downward to maintain a target illuminance level at a particular location or feature in the area, for example as determined by feature recognition through image processing. The controller can first determine an absolute illuminance delivered by the fixtures within the region of illumination, and then scale the light output of those fixtures so that the absolute illuminance delivered by the lighting fixtures matches (i.e., is approximately the same as) the target illuminance. The target illuminance level can be an overall illuminance for a space that includes the region of illumination, or for a particular feature or location within the space, such as the occupant location. There are several techniques the controller can implement to determine the overall illuminance delivered by the lighting fixtures, for example by summing the total light output of the light fixtures within the region of illumination, or by using one or more light sensors that measures the overall illuminance within the region of illumination.

FIGS. 3A, 3B, 3C and 3D illustrate block diagrams of a perspective top view of a room implementing a system including multiple lighting fixtures and showing, respectively, the occupant in a first position, a second position, a third position and a fourth position, configured in accordance with an embodiment of the present disclosure. FIGS. 3A-3D illustrate one example embodiment of a perspective view of an occupant moving through the room where a cloud or region of illumination follows an occupant. Note that the occupant 310 is shown with respect to six lighting fixtures, each denoted 'F' and that, in accordance with the teachings of the present disclosure, the region of illumination follows the occupant 310 as the occupant moves about the space having the fixtures F301, F302, F303, F304, F305 and F306.

Figure 4:
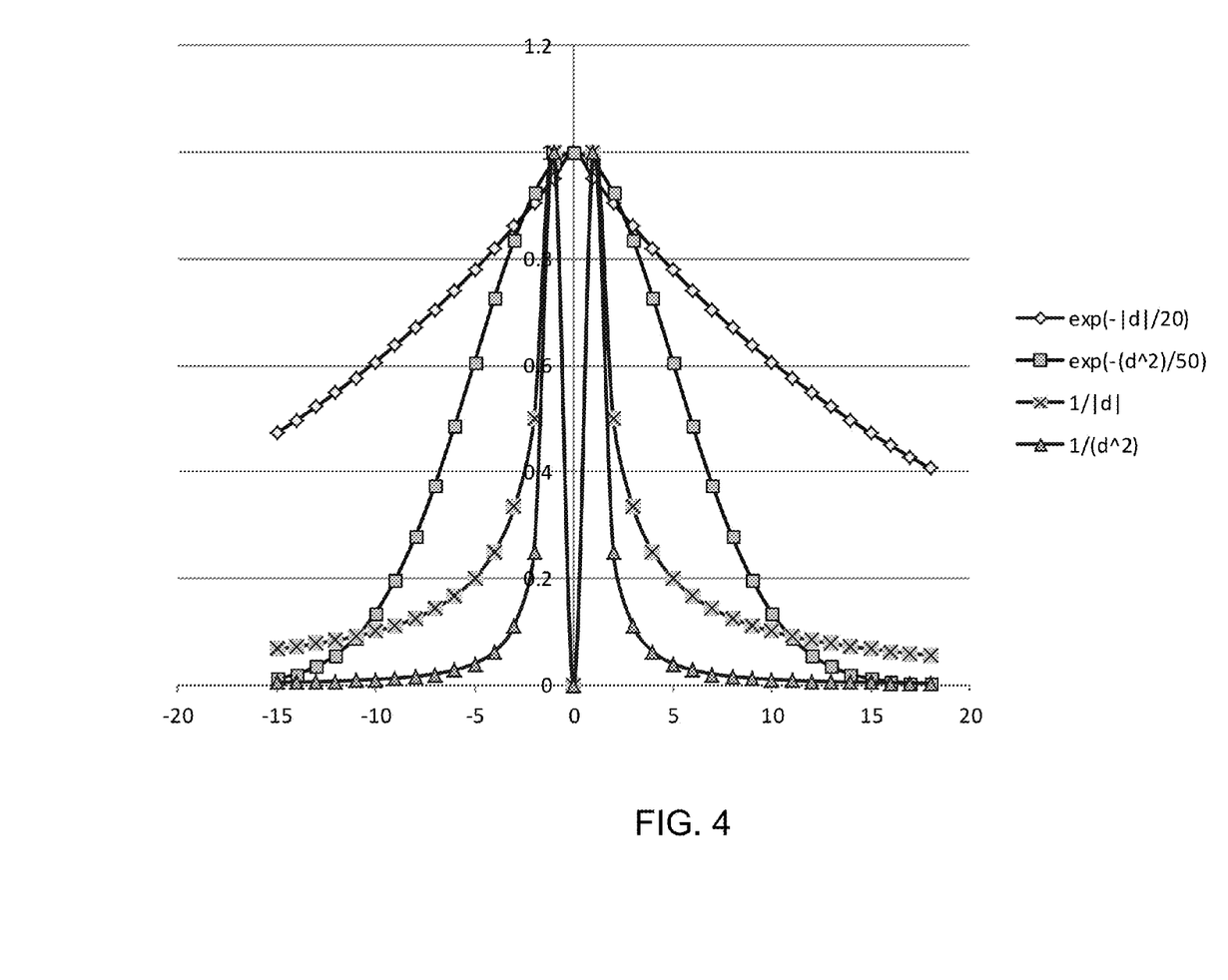
FIG. 4 illustrates an example graphical diagram showing waveforms for example functions that can be implemented by a controller to provide temporally and spatially smooth lighting, according to embodiments disclosed herein.

The light output of each fixture within the space is determined using a function that varies the light output of a lighting fixture depending on the location of the occupant with respect to the lighting fixture. Refer to FIG. 4 for example functions that can be used to determine lighting fixture outputs to create a region of illumination which has highest illuminance at the center point, where the occupant 310 is located, and gradually fades out to zero (or low) illuminance.

Figure 3A:
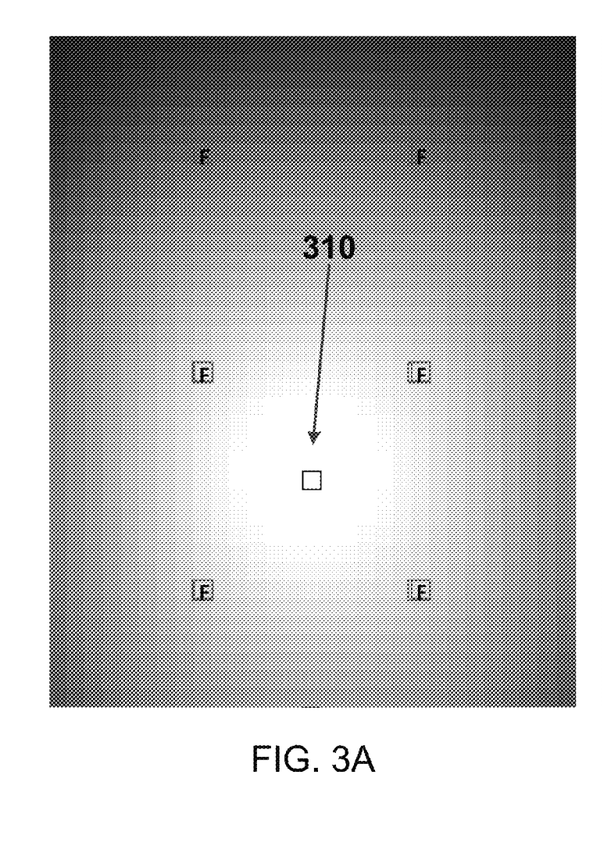
FIG. 3A illustrates a block diagram of a perspective top view of a room implementing a system including multiple lighting fixtures and showing the occupant in a first position, configured according to embodiments disclosed herein.
Figure 3B:
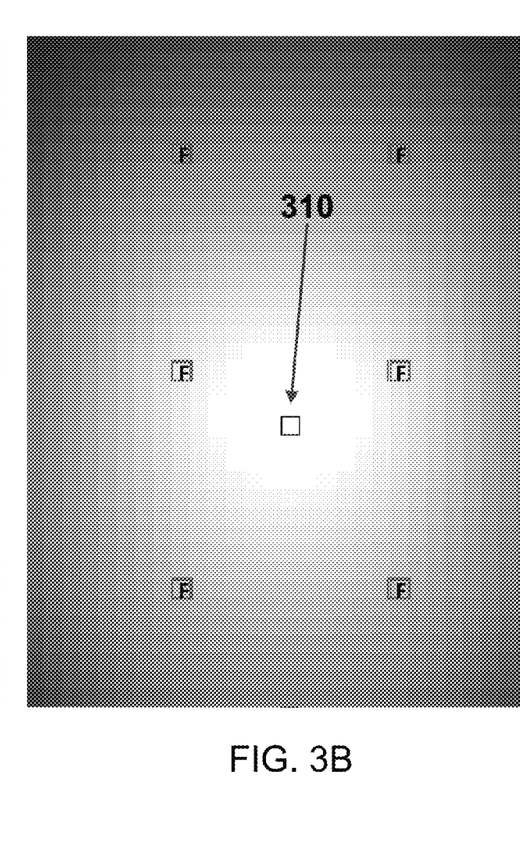
FIG. 3B illustrates a block diagram of a perspective top view of a room implementing a system including multiple lighting fixtures and showing the occupant in a second position, configured according to embodiments disclosed herein.
Figure 3C:
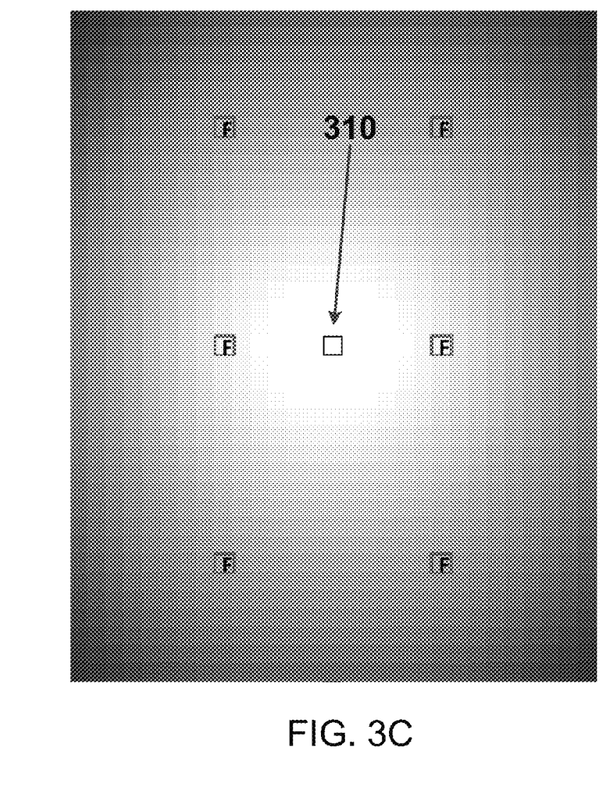
FIG. 3C illustrates a block diagram of a perspective top view of a room implementing a system including multiple lighting fixtures and showing the occupant in a third position, configured according to embodiments disclosed herein.
Figure 3D:
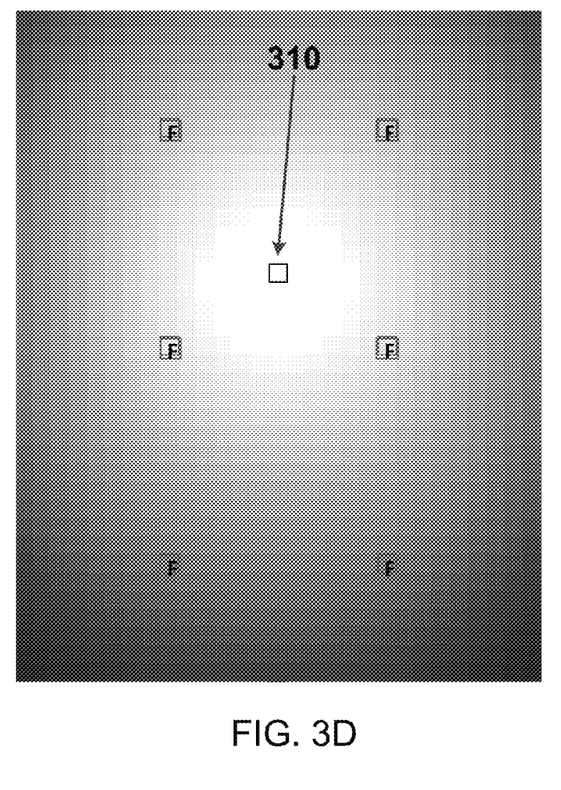
FIG. 3D illustrates a block diagram of a perspective top view of a room implementing a system including multiple lighting fixtures and showing the occupant in a fourth position, configured according to embodiments disclosed herein.

As shown in FIG. 3A, the occupant is positioned between the lower four fixtures F303, F304, F305 and F306, with the center of the illuminated region at the first location of the occupant 310, and fading out to no or low illuminance by the top-most two fixtures. Note that the output of each fixture within the space is controlled in accordance with the techniques disclosed herein to create the region of illumination surrounding the occupant 310. Fixtures F303, F304, F305 and F306 each contribute approximately equally to the illuminance level at the occupant location, while fixtures F301 and F302 contribute less to the region of illumination. As shown in FIG. 3B, the cloud follows the occupant around the room so that the center point, where the occupant 310 is located at the second position, has the highest illuminance. Note that light from each fixture is still contributing to the region of illumination surrounding the occupant 310 in accordance with techniques disclosed herein. However, fixtures F305 and F306 are contributing less to the region of illumination than they were in FIG. 3A, and fixtures F303 and F304 are contributing more (meaning, their light output is increased versus FIG. 3A), and fixtures F301 and F302 are also contributing more (increased light output as compared with FIG. 3A). As shown in FIG. 3C, the occupant 310 is positioned directly in the center of the space. Note that the illuminance remains highest at the center of the region, where the occupant 310 is located at the third position, with a similar region of illumination. Fixtures F305 and F306 are contributing even less to the region of illumination in FIG. 3C (where the light output is decreased as compared to FIG. 3B) and the fixtures F303 and F304 have increased, as well as fixtures F301 and F302, as compared to FIG. 3B. As shown in FIG. 3D, the occupant 310 is positioned at a fourth point that is furthest from the first (initial) point in FIG. 3A. In FIG. 3D, (as compared with FIG. 3C), the light output of fixture F301 and F302 are increased, and the light output from fixtures F303 and F304 have decreased, and the light output of fixtures F305 and F306 are also decreased. The extent of the region of illumination is also similar in FIG. 3D as in FIGS. 3A-3C, however the region need not be exactly the same as the occupant moves throughout the space. The size and shape of the region (or cloud) of illumination can change depending upon the location of the occupant, the placement of the lighting fixtures and sensors, and other factors, as will be appreciated in light of this disclosure.

Note that the cloud of illumination in FIGS. 3A-3D illustrate one example region of illumination that is achieved by applying a function to control the output of fixtures in a space, where the function depends upon the location of the occupant (and in some embodiments the distance between the occupant and the lighting fixture). The particular function implemented can be, for example, a custom specific function or a look-up table of the output level that is desired based upon the location (or separation distance) of the occupant.

FIG. 4 illustrates an example graphical diagram showing waveforms for example functions that can be implemented by a controller to provide temporally and spatially smooth lighting, in accordance with an embodiment of the present disclosure. In accordance with an embodiment of the present disclosure, the output of each light source surrounding an occupant can be expressed by a function that depends upon the separation between the light source and the occupant. Generally, a given light source becomes brighter when the occupant moves toward it, and dimmer as the occupant moves away from the light source which can be expressed as a function, where the amount of light output of a lighting fixture, or other type of light source, fades as it becomes further away from the occupant. The exact fadeout function that is used to determine the reduction in light output as occupant separation increases can vary in accordance with the techniques disclosed herein. If d is the separation between the occupant and the particular light source, then light output can be scaled as $\exp[-d^2/\text{fadeoutwidth}]$ where fadeoutwidth is a parameter that determines how rapidly the light source is dimmed as the occupant moves away from it. Other functions which fall off from a maximum at a distance d of zero could also be implemented in accordance with the embodiments of the present disclosure. Example functions and their corresponding waveforms are shown in FIG. 4.

As illustrated in FIG. 4, functions such as $1/|d|$ and $1/(d^2)$ have undesirable qualities as d becomes very small. Note that as the distance d approaches zero (when user is closest to the lighting fixture) the numerical value for the functions can undesirably become very large. Note that these values have a zero value on the graph at d=0, because the number is so large it becomes undefined by simulation software. Thus, it may be possible to modify the function in this region, for example to provide a numerical value of 1 for a d between −1 and 1. For example, the functions can be modified in the undesirable regions to obtain flat behavior for small d, for example when −1<d<1. In general, functions can be constructed to have a somewhat flat profile near d=0 to minimize light fluctuations in this region. As illustrated in FIG. 4, the functions $\exp(-|d|/20)$ and $\exp(-(d^2)/50)$ provide two example functions, in accordance with an embodiment of the present disclosure. These functions can be customized, for example, to provide specific numerical values corresponding to given distances between the lighting fixture and the occupant, or can provide a specific numerical value for a range of distances. The resulting pattern is a cloud or region of illumination around the occupant, as shown in FIGS. 3A-3D, which can be adjusted by adjusting the numerical values of the fadeout function.

The fadeout function can also be a custom function, or a look-up table where each distance has a respective value, or a set of distance ranges each have a corresponding value. In this manner, the light output of the fixtures is set by the controller based upon that custom function, in accordance with an embodiment of the present disclosure. A custom function, for example, could include the curve of $1/|d|$ or $1/(d^2)$, with the output values being altered as the distance d approaches zero, to eliminate the undesirable qualities, and provide the maximum light output (and thus the maximum target illumination) as d approaches zero. The function can also be customized to control the spatial range over which illumination is provided by the system. For example, in some embodiments, it may be desirable for the lighting fixture to turn off completely once the occupant is a certain distance away from the lighting fixture, for example greater than 20 feet away from the lighting fixture. In this scenario, the function would provide a smooth fadeout up to a certain distance, and then the light would turn off completely.

For independently operating lights, the overall illumination pattern in a space may be determined by the fadeout function but the absolute illuminance at the occupant is not controlled, in some embodiment of the present disclosure. If there are many light sources near an occupant, the illuminance will be higher due to contributions from multiple sources.

The light level at the position of the occupant can be controlled in accordance with an embodiment where the light sources are networked and controlled together as a system. The light output of each fixture in the system can thus be proportionally scaled up or down, as needed to obtain a desired absolute illuminance at the occupant location, while preserving the smooth distribution of light and relative brightness of the many sources to each other in accordance with the teachings herein. The illuminance, at the occupant location can be maintained at a desired level as the occupant moves throughout the room in accordance with an embodiment. In an embodiment, the scaling can be determined via feedback sensors or by calculations simulating the level of light at the occupant based on knowledge of the light emitting characteristics of the sources.

To further smooth the changes in illumination as an occupant moves throughout a room, in some embodiments a maximum rate of change in light output can be imposed on the light sources. In this manner, sudden or fast translational motion on the part of the occupant would not result in sudden or fast changes in the lighting. Thus, the lighting response can be slowed to a more pleasant rate.

Figure 5:
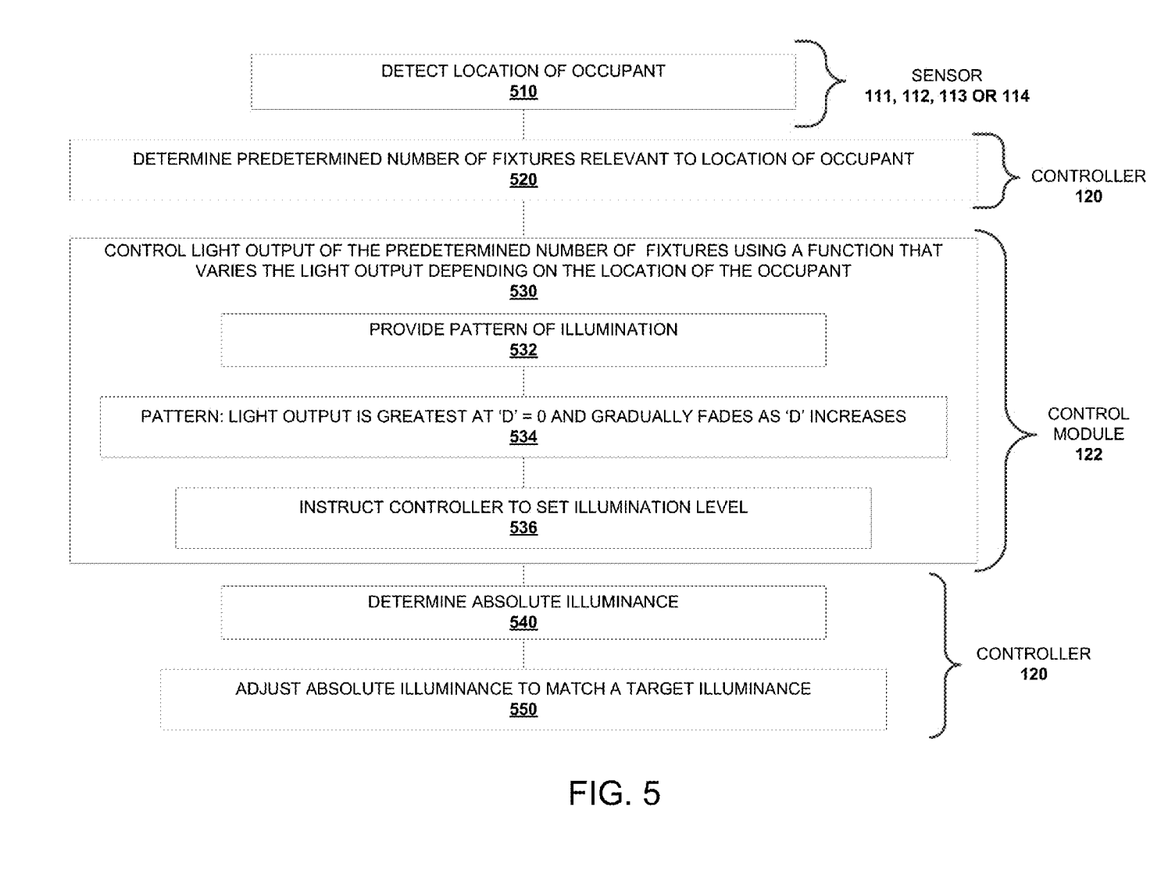
FIG. 5 illustrates a methodology for providing temporally and spatially smooth lighting, according to embodiments disclosed herein.

FIG. 5 illustrates a method to implement a temporally and spatially smooth lighting system. The method provides lighting which varies continuously and smoothly as the occupant moves throughout a space. The method determines 510 a location of the occupant in a space. Generally, the location of the occupant can be specified with high spatial resolution and the uncertainty in occupant location in some embodiments is less than the spacing between the light sources. In some embodiments, the location of the occupant is determined to within 1-2 feet, or a higher precision, to within inches. For example, the location of the occupant can be detected by one or more of the sensors 111, 112, 113 or 114 from FIG. 1.

One technique for determining the location of the occupant is to provide a plurality of standard occupancy sensors, such as passive infrared (PIR) and others, that are used together to determine a precise location of the occupant. Another technique for determining the location of the occupant is to implement one or more cameras as the sensor(s). The cameras can provide two-dimensional (2D) or three-dimensional (3D) imaging data that can be analyzed to determine the location of the occupant with respect to the field of view of the camera.

Given the location of the occupant, the method specifies 520 a predetermined number of fixtures that are proximate to (i.e. within a predetermined distance of) the location of the occupant or otherwise relevant to the location of the occupant. The number of fixtures proximate to the location of the occupant can be performed, for example, by the controller 120 of FIG. 1. The predetermined number of fixtures that are relevant to the location of the occupant can be determined by the controller or by a processor operatively connected to the controller that receives position data from the sensors via the controller. In some embodiments, the sensors can be operatively connected to the processor rather than the controller. In some embodiments, the method can specify 520 that all lighting fixtures within the area are relevant to the location of the occupant and thus will have the function applied to all fixtures to achieve the target illuminance at the location of the occupant or other target feature. In some embodiments, the predetermined number of lighting fixtures can be set to be all lighting fixtures within a predetermined distance of the location of the occupant, for example all fixtures within 10 feet of the location of the occupant. In some embodiments, specifying 520 the number of lighting fixtures is omitted, and rather the location is detected, and then all fixtures under control of the controller are deemed relevant to the location of the occupant.

The method controls 530 the light output of the predetermined number of lighting fixtures, using a controller operatively connected to each lighting fixture. The controller controls the light output of each lighting fixture using a function that provides a region of illumination that includes the light output of each of the predetermined number of lighting fixtures. The function varies (i.e., changes) the light output of each of the lighting fixtures within the region of illumination depending upon the location of the occupant within the space in accordance with techniques of the present disclosure. By providing a gradual change in the light output of a lighting fixture, based upon the location of the occupant, this eliminates the harsh and sudden on-or-off that is traditionally associated with occupancy sensors that are used to merely detect the presence of an occupant within a space. By determining a position and applying a function to the lighting fixture based on the position in accordance with the techniques disclosed herein, a spatially and temporally smooth lighting pattern is achieved.

The light output of the predetermined fixtures can be controlled 530 using the function, which can be achieved by a control module 122. The light output is controlled 530 by first providing a pattern of illumination 532 surrounding the occupant that is based on the location of the occupant. The pattern is such that the light output is greatest at 'D' (the distance between the occupant and the lighting fixture) of 0, and gradually fades as 'D' increases, and as the occupant moves further away from the lighting fixture. The control module 122 instructs the controller to set the illumination level 536. In some embodiments, the elements 530, 532, 534, 536 can be performed by the processor 130, rather than the control module 122, or the controller, control module 122 and processor 130 can all be integrated into a single microchip or electronic device that performs the functions in accordance with the embodiment.

The method can determine 540 the absolute illuminance for the region of illumination. The absolute illuminance can be used by the controller (for example controller 120 of FIG. 1) to maintain the region of illumination (or a particular spot within the region) at a target illuminance. There are several techniques that can be implemented for determining the absolute illuminance. For example, the light output of each lighting fixture can be summed together to determine the absolute illuminance, or a sensor, camera, or other device can be used to measure the illuminance delivered by the lighting fixtures within the region of illumination. A target illuminance can be specified for an entire region of illumination, or for one particular location of feature or interest within the space. An appropriate sensor, such as a light sensor or camera, can be used to detect the absolute illuminance at a particular location. The method adjusts 550 the absolute illuminance so that it matches (i.e., is approximately equal to) the target illuminance, in accordance with an embodiment. The absolute illuminance can be adjusted by the controller scaling the light output (or another lighting parameter) of the lighting fixtures in the region of illumination until the absolute illuminance is approximately equal to the target illuminance.

The systems and method shown and described herein are likewise applicable to scenarios involving multiple occupants. There are various techniques for handling a situation with multiple occupants. Generally, each occupant will demand a different light output from a particular fixture based on the distance between that occupant and the luminaire. The luminaire then applies a rule to determine which of the demanded light output levels should be provided. An example first rule can include providing light according to the highest of the different demands, to make sure that the requested light level or higher is delivered. An example second rule can include providing the average of the different demands to a particular lighting fixture. An example third rule can include providing the illumination demanded by the occupant with the highest priority, where the priority of occupants can be determined by arrival time, occupancy duration, location in the room, specific identification (ID) of the occupant, or other criteria.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A system comprising:
   a sensor configured to sense a location of an occupant within a space;
   a controller configured to receive data from the sensor and control illumination provided by a plurality of lighting fixtures; and
   a control module at least one of executable on and controllable by the controller and configured to identify one or more lighting fixtures in the plurality of lighting fixtures relevant to the location of the occupant based on data from the sensor, and further configured to control a light output of the one or more lighting fixtures to provide a region of illumination surrounding the occupant that is based on the location of the occupant, wherein the illumination is spatially and temporally smooth lighting.

2. The system of claim 1, wherein the controller is configured to change the light output of the one or more lighting fixtures according to a function that is based upon a distance between the occupant and the one or more lighting fixtures.

3. The system of claim 2, wherein the function provides that the one or more lighting fixtures become brighter by the controller as the distance decreases, and the one or more lighting fixtures become dimmer by the controller as the distance increases.

4. The system of claim 1, wherein the light output of the one or more lighting fixtures are scalable by the controller to maintain a target illuminance at a particular feature within the space.

5. The system of claim 4, wherein the particular feature is the location of the occupant.

6. The system of claim 1, wherein the system has a maximum allowed predetermined rate of change in the light output of the one or more lighting fixtures.

7. The system of claim 1, wherein a target illuminance at the location of the occupant is specified, and the controller is configured to scale the light output of the one or more lighting fixtures to collectively maintain the target illuminance.

8. The system of claim 1, wherein the sensor comprises a plurality of passive infrared (PIR) occupancy sensors that are used to determine the location of the occupant.

9. The system of claim 1, wherein the sensor comprises a camera, and wherein the location of the occupant is determined by analyzing two-dimensional (2D) or three-dimensional (3D) imaging data acquired by the camera.

10. The system of claim 1, wherein the plurality of lighting fixtures are networked and the controller is configured to maintain a target illuminance at the location of the occupant at a desired predetermined value as the occupant moves around by communicating with the plurality of lighting fixtures over a wireless network.

11. A method comprising:
    determining, using a sensor, a location of an occupant within a space;
    determining a predetermined plurality of lighting fixtures pertinent to the location of the occupant; and
    controlling a light output of one or more lighting fixtures of the predetermined plurality of lighting fixtures, using a controller operatively connected to the sensor and the predetermined plurality of lighting fixtures, wherein the light output of the one or more lighting fixtures is controlled using a function, wherein the function provides a region of illumination surrounding the occupant, wherein the illumination is spatially and temporally smooth lighting.

12. The method of claim 11, further comprising:
controlling, by the controller, the one or more lighting fixtures in the space using the function, wherein the function changes the light output of the one or more lighting fixtures depending upon the distance the occupant is separated from the one or more lighting fixtures.

13. The method of claim 12, further comprising:
controlling, by the controller, the one or more lighting fixtures to become brighter as the distance decreases, and to become dimmer as the distance increases.

14. The method of claim 11, further comprising:
controlling, by the controller, the one or more lighting fixtures to maintain a target illuminance at the location of the occupant.

15. The method of claim 11, wherein the sensor is a camera, and further comprising:
analyzing, by the controller, two-dimensional (2D) or three-dimensional (3D) imaging data to determine the location of the occupant.

16. A computer program product comprising one or more non-transitory processor-readable mediums encoded with instructions that, when executed by one or more processors cause a process to be carried out to provide spatially and temporally smooth lighting to an occupant, the process comprising:
determining, using a sensor, a location of the occupant within a space;
determining a predetermined plurality of lighting fixtures pertinent to the location of the occupant; and
controlling a light output of one or more lighting fixtures of the predetermined plurality of lighting fixtures, using a controller operatively connected to the sensor and the predetermined plurality of lighting fixtures, wherein the light output is controlled using a function, wherein the function provides a region of illumination surrounding the occupant, wherein the illumination is spatially and temporally smooth lighting.

17. The computer program product of claim 16, wherein the process further comprises:
controlling, by the controller, the one or more lighting fixtures in the space as a function of a distance the occupant is separated from the lighting fixture.

18. The computer program product of claim 17, wherein the process further comprises:
controlling, by the controller, the one or more lighting fixtures to become brighter as the distance decreases, and to become dimmer as the distance increases.

19. The computer program product of claim 16, wherein the process further comprises:
controlling, by the controller, the one or more lighting fixtures to maintain a target illuminance at the location of the occupant.

20. The computer program product of claim 16, wherein the sensor is a camera and wherein the process further comprises:
analyzing, by the controller, two-dimensional (2D) or three-dimensional (3D) image data to determine the location of the occupant.

* * * * *